United States Patent [19]

Freitag et al.

[11] 4,400,600
[45] Aug. 23, 1983

[54] GAS SPRING ARRANGEMENT OPERATING AS AN ELECTRICAL CONNECTION

[75] Inventors: Herbert Freitag, Koblenz-Metternich; Klaus Schnitzius, Rheinbrohl, both of Fed. Rep. of Germany

[73] Assignee: Stabilus GmbH, Koblenz-Neuendorf, Fed. Rep. of Germany

[21] Appl. No.: 200,059

[22] Filed: Oct. 23, 1980

Related U.S. Application Data

[62] Division of Ser. No. 952,092, Oct. 17, 1978, Pat. No. 4,316,098.

[30] Foreign Application Priority Data

Oct. 28, 1977 [DE] Fed. Rep. of Germany ....... 2748376

[51] Int. Cl.³ .......................................... H01H 3/16
[52] U.S. Cl. .............................. 200/52 R; 200/61.62; 200/82 D; 200/61.44
[58] Field of Search ............... 200/61.62, 52 R, 61.44, 200/82 D; 307/119

[56] References Cited

U.S. PATENT DOCUMENTS 3,919,509 11/1975 Schnitzius .................. 200/61.62

FOREIGN PATENT DOCUMENTS 1267368 3/1972 United Kingdom.

*Primary Examiner*—J. R. Scott
*Attorney, Agent, or Firm*—Brumbaugh, Graves, Donohue & Raymond

[57] ABSTRACT

A gas spring arrangement in which conductive terminals on the cylinder and piston rod of a gas spring are connected by a conductive path insulated from the cylinder and piston rod. The path may be provided in part by contact elements on the cylinder and piston rod outside the cylinder cavity which engage each other when the piston rod approaches its axially terminal position during inward movement into the cavity. The path may also be provided in part by an insulated conductor helically wound on the piston rod in the cavity or outside. It may also include an axially elongated conductor secured to the axial cylinder wall outside the cavity.

16 Claims, 5 Drawing Figures

GAS SPRING ARRANGEMENT OPERATING AS AN ELECTRICAL CONNECTION

This is a division of application Ser. No. 952,092, filed Oct. 17, 1978, now U.S. Pat. No. 4,316,098.

BACKGROUND

1. Field of Invention

This invention relates to gas springs modified to operate as an electrical connection, and particularly to gas spring arrangements including such a gas spring.

2. The Prior Art

A gas spring, as the term is most commonly understood, includes a cylinder whose cavity encloses a body of gas under high pressure, and a piston rod or plunger movably sealed in an end wall of the cylinder for axial movement into and out of the cavity. The gas tends to expel the piston rod from the cavity and resiliently opposes inward piston rod movement under the weight of a sprung mass.

It is known from German published applications Nos. 2,332,791; 2,421,007; and 2,614,927, as well as from German utility model No. 7,304,750 and British Pat. No. 1,282,568 that a gas spring, when interposed between a movable closure and a fixed body portion of a motorcar, may be employed for controlling movement of the closure about a horizontal axis, and may simultaneously provide a conductive path between a source of electric current on the fixed body portion, and an electrically operated device mounted on the closure, such as a lamp, a window heater, or a window wiper.

The known gas spring arrangements can provide only a single electric circuit, and there exists a need in many instances for multiple, independent circuits separately connecting several current-consuming devices on a closure member with a current source on the fixed body portion through respective switches.

SUMMARY

It is a primary object of this invention to improve the current carrying ability of gas spring arrangements of the type described beyond that available heretofore.

It is a more specific object to provide at least two separate current paths through a gas spring.

With these and other objects in view, as will hereinafter become apparent, the invention provides a gas spring arrangement in which conductive terminals on the cylinder and piston rod of a gas spring are connected by a conductive path insulated from the cylinder and piston rod. In conjunction with a known arrangement employing the cylinder and piston rod as portions of a circuit between another pair of terminals, the invention thus provides an independent second circuit.

BRIEF DESCRIPTION OF THE DRAWINGS

Other features, additional objects and many of the attendant advantages of the invention will readily be appreciated as the same becomes better understood by reference to the following detailed description of preferred embodiments when considered in connection with the appended drawing in which:

FIG. 2a shows a portion of the device of FIG. 2 in section on the line IIa—IIa.

DESCRIPTION OF EXEMPLARY EMBODIMENTS

Figure 1:
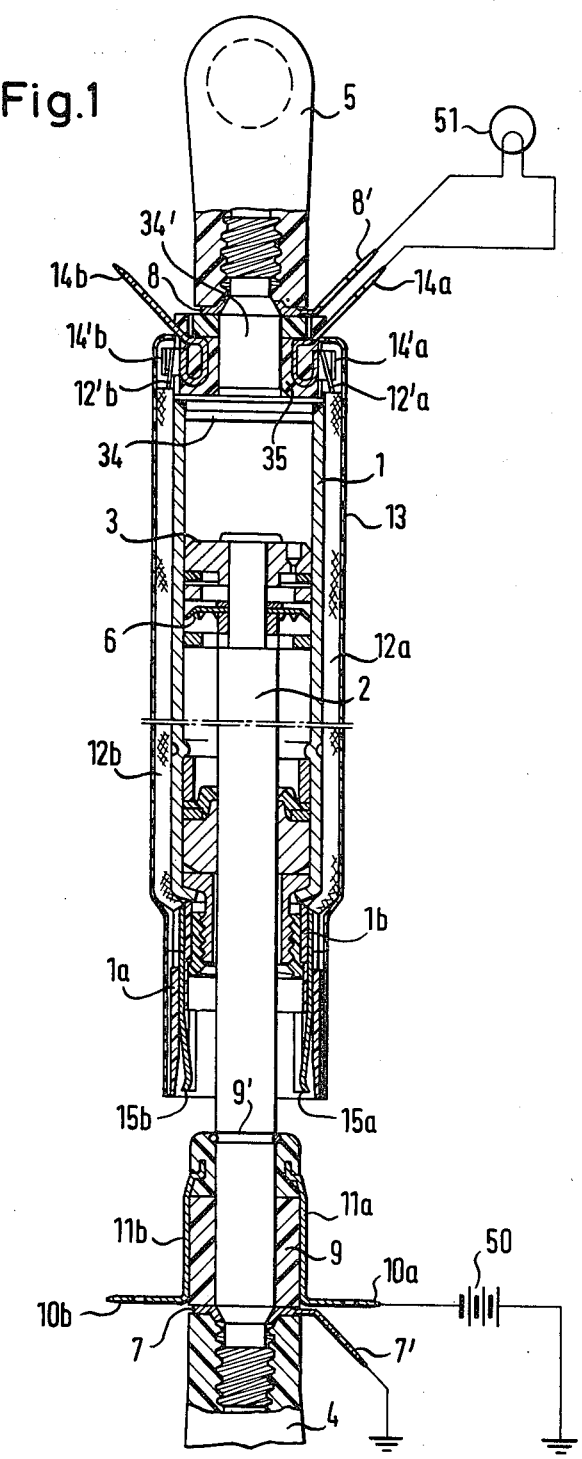
FIGS. 1 to 4 illustrate respective gas spring arrangements of the invention in elevational section.

Referring now to the drawing in detail, and initially to FIG. 1, there is shown only as much of a gas spring arrangement and of associated elements of a motorcar as is needed for an understanding of the invention.

The gas spring proper mainly consists of a cylinder 1, a piston rod 2 movable vertically inward and outward of the cavity in the cylinder through an annular end wall of the latter, a damping piston 3 mounted on the axially terminal portion of the piston rod 2 in the gas-filled cavity of the cylinder 1 and provided with an axial throttling passage therethrough, and two plastic fastening eyes 4, 5 on the axially remote terminal portions of the piston rod 2 and cylinder 1 respectively. A star-shaped, sliding contact 6 of spring-temper metal mounted on the piston rod 2 near the piston 3 makes sliding contact with the inner cylinder surface during axial movement of the piston rod so that a closed circuit is maintained by the cylinder and piston rod between a terminal 7' on the piston rod 2 and a terminal 8' on the cylinder 1 closely adjacent respective fastening eyes 4, 5. The structure described so far is known.

According to the invention, two additional circuits, insulated from the cylinder and piston rod and from each other are provided. A tubular plastic body 9 is coaxially mounted on the terminal portion of the piston rod 2 outside the cylinder cavity and axially secured between a spring clip 9' and the fastening eye 4 which threadedly engages the free end of the piston rod. A dished washer 7, integral with the radially elongated terminal 7' is clamped between the fastening eye 4 and the body 9.

Two L-shaped brass strips are insulated from the piston rod 2 and the washer 7 by the body 9 in which their axially elongated legs 11a, 11b are embedded so as to secure the strips to the piston rod. Horizontal legs 19a, 10b of the brass strips radially project from the body 9 to provide two additional terminals on the piston rod which are readily accessible outside the cylinder cavity.

An annular plastic insulator 35 is attached coaxially to the upper, metallic, transverse end wall 34 of the cylinder 1. A metallic stud 34' extends axially outward of the cylinder cavity from the end wall 34, passes through the central aperture of the insulator 35, and its free end threadedly engages the fastening eye 5. A dished washer 8 is clamped between the eye 5 and the insulator 35 in electrically conductive contact with the stud 34' and thereby the cylinder 1, and is integral with the afore-mentioned, radially elongated terminal 8'.

Two brass strips 14a, 14b are molded into the insulator 35 in such a manner that respective ends of the strips project as accessible terminals from the insulator 35 closely adjacent the eye 5 while the respective other ends are exposed in the cylindrical, axial surface of the insulator and soldered to bare metal ends 14'a, 14'b of two insulated conductors 12a, 12b. The conductors extend axially downward from the strips 14a, 14b along the outer cylinder surface. They are of non-circular cross section, elliptic or rectangular so as to provide maximum current carrying capacity with minimal radial dimensions, the circumferential width of each conductor and of its wire core being greater than its radial depth. The conductors 12a, 12b are fastened to the outer cylinder surface by an enveloping plastic sleeve 13 which projects downward beyond the cylinder 1.

Two leaf springs 15a, 15b are soldered to the wires in the conductors 12a, 12b respectively and are clamped radially between a cylindrical, plastic, reinforcing ring 1a in the portion of the sleeve 13 which projects beyond the cylinder 1 and a similar plastic, cylindrical ring 1b on the cylinder 1. The lower ends of the springs 15a, 15b are radially movable to a limited extent. When the piston rod 2 moves inward of the cylinder cavity or upward from the illustrated position into one of its axially terminal positions, the axial legs 11a, 11b on the plastic body 9 slidably engage the springs 15a, 15b respectively as movable contacts, thereby providing continuous, insulated, conductive paths between the terminals 10a, 14a and the terminals 10b, 14b as the piston rod 3 approaches its uppermost position.

When the eyes 4, 5 are fastened to a closure part and to the fixed body part of an automotive vehicle in such a manner that the switch constituted by the contact elements 11a, 11b, 15a, 15b is closed when the closure part is in its normal operative position, the illustrated spring arrangement may connect a current source, such as a storage battery 50 on the fixed body portion with a current consuming device, such as an incandescent lamp 51 on the closure. One pole of the battery 50 is connected to the terminal 10a while the other pole is grounded to the fixed body portion, as is the terminal 7'. The filament of the lamp 51 is connected to the terminals 8' and 14a on the cylinder 1. An additional device, not illustrated, such as a windshield wiper, may be energized through the terminals 10b, 14b, a return line to the battery 50 being provided through the terminals 8', 7'. More than two insulated conductors are readily accommodated between the sleeve 13 and the outer cylinder wall and may be connected with additional terminals on the cylinder 1 and piston rod 3 in a manner obvious from FIG. 1, and switched by means of additional contact elements on the rings 1a, 1b and the body 9. The return line through the sliding contact 6 remains continuous in all positions of the piston rod 3 relative to the cylinder 1. If so desired, a device that is to remain energized in all positions of the closure, such as a lamp illuminating the license plate, may be energized through the sliding contact 6, and a common return line for all three illustrated circuits may be provided by the metallic hinges fastening the closure to the fixed body portion.

The fastening eyes 4, 5 insulate the gas spring from the objects connected thereto by the fastening eyes. The eyes are fastened to the body portion and closure of the vehicle in such a manner that their respective pivot axes remain parallel so that the necessary axial alignment between the contact elements 15a, 15b on the cylinder 1 and the contact elements 11a, 11b on the piston rod is maintained without the need for other known devices for preventing relative angular displacement of the piston rod and cylinder about the axis of the latter. If the fastening eyes 4, 5 are made of metal and conductively attached to the piston rod 2 and cylinder 1 respectively, the terminals 7', 8' may be omitted.

Figure 2:
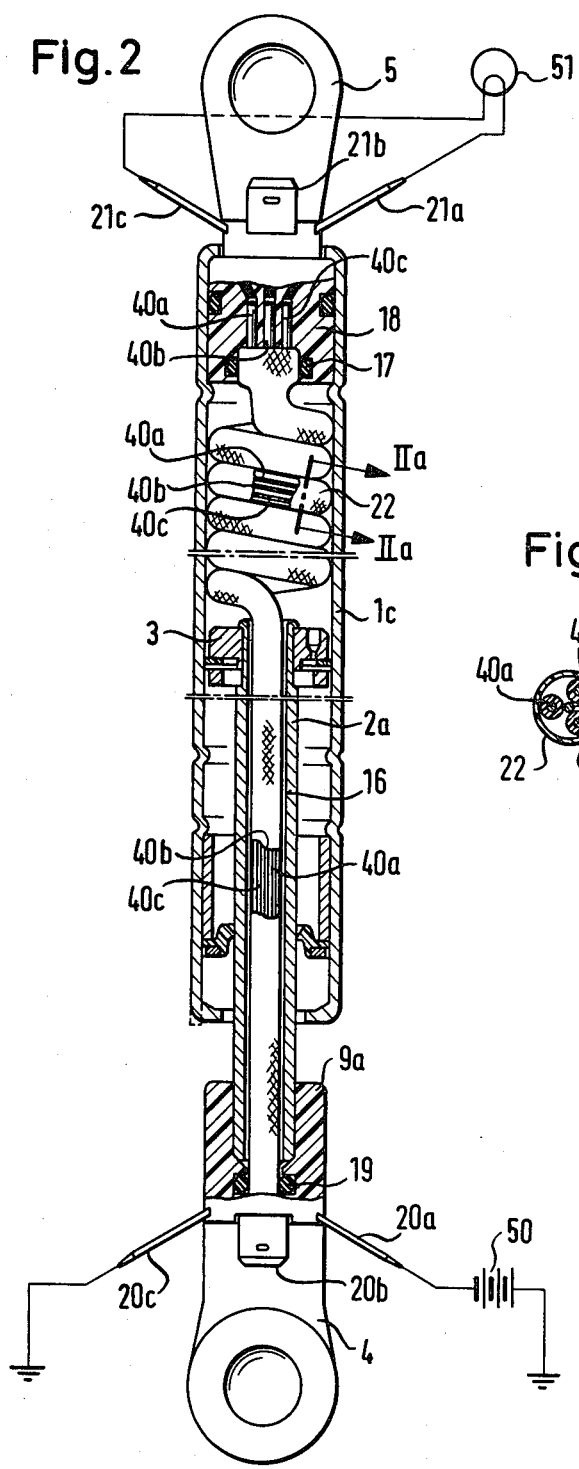

The modified gas spring arrangement shown in FIG. 2 includes a cylinder 1c in which a piston rod 2a is axially slidable. Its inner end carries a piston 3, and its outer end a fastening eye 4, a fastening eye 5 being attached to the transverse end wall 18 of the cylinder 1c remote from the eye 4. That end wall is a plastic plug which partly projects outward of the cylinder cavity. Three terminals 21a, 21b, 21c radially project from the portion of the plug 18 outside the cylinder cavity.

Three terminals 20a, 20b, 20c radially project from a tubular, plastic body 9a on the outer axial end of the piston rod 2a which is tubular. Respective ends of a pliable plastic hose 22 passing through the bore 16 of the piston rod 2a are sealed to the body 9a and the plug 18 by sealing rings 19, 17. Three insulated wires 40a, 40b, 40c extend over the entire internal length of the hose 22, and their three pairs of bare metal ends are soldered to the terminals 20a, 20b, 20c and 21a, 21b, 21c as is only partly illustrated. A spring steel wire 41 (FIG. 2a) is enclosed with the wires 40a, 40b, 40c in the portion of the hose 22 which extends from the inner end of the piston rod 3 to the lower transverse face of the plug 18. When in the relaxed condition, the wire assumes the shape of a tightly wound helix. The portions of the flexible wires 40a, 40b, 40c longitudinally coextensive with the steel wire 41 thus assume the same shape. They are axially deformed to increase the pitch of the helix when the piston rod 2a moves axially outward of the cylinder 1c from the illustrated position, the wire 41 being not strong enough to overcome the pressure of the gas, not specifically illustrated, which fills the cavity of the cylinder 1c.

The spring arrangement illustrated in FIG. 2 provides three circuits between respective terminals on the cylinder 1a and piston rod 2a. The circuits are insulated from each other and from the cylinder and piston rod of the gas spring. A fourth circuit or a common return line for the illustrated circuits may be had in a manner obvious from FIG. 1 by mounting a sliding contact on the piston rod 2a, and additional terminals on the plug 18 and plastic body 9a, or on conductive fastening eyes replacing the illustrated plastic eyes 4, 5. A battery 50 and lamp 51 are shown to illustrate the use of one of the available circuits.

Figure 3:
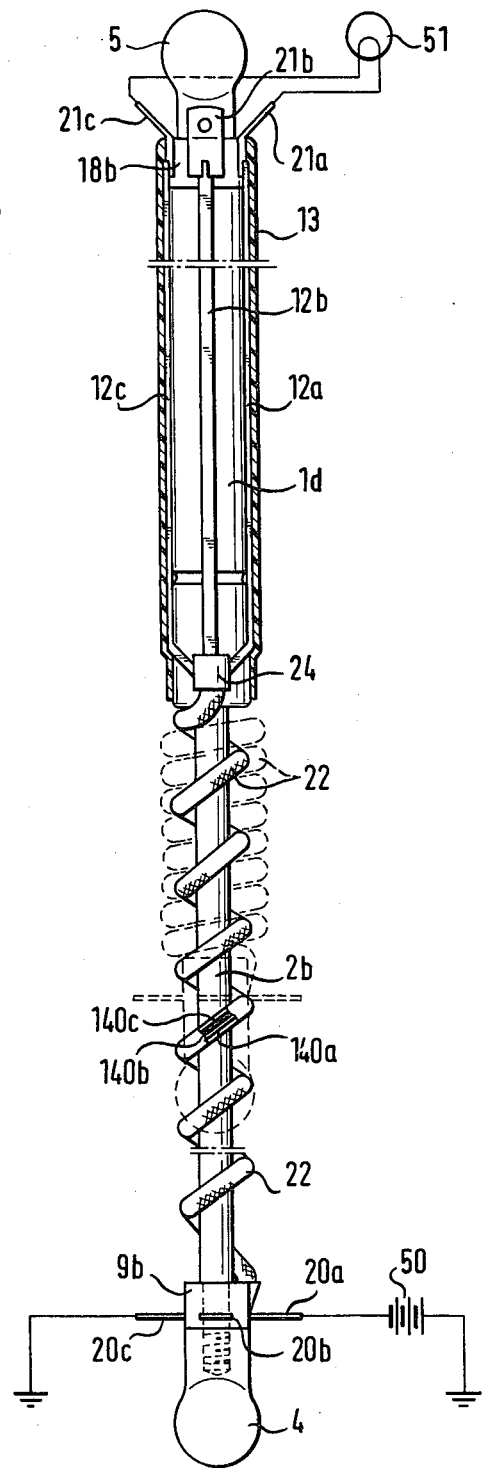

FIG. 3 shows an additional gas spring arrangement of the invention whose cylinder 1d and piston rod 2b cooperate in the manner described to vary the axial spacing of fastening eyes 4, 5 attached to respective, axially remote terminal portions of the cylinder and piston rod. A tubular plastic body 9b on the piston rod adjacent the eye 4 carries three terminals 20a, 20b, 20c, and a plastic plug 18b axially sealing the end of the cylinder 1d adjacent the eye 5 carries three corresponding terminals 21a, 21b, 21c. The two sets of terminals are connected in all relative positions of the piston rod 2b and cylinder 1d by three insulated conductors.

Respective conductor portions 140a, 140b, 140c and a spring steel wire, corresponding to the wire 41 shown in FIG. 2a, but not visible in FIG. 3, are encased in a pliable plastic hose 22 which extends in a helix about the portion of the piston rod 2b outside the cavity of the cylinder 1d. One end of the hose 22 is attached to an adapter 24 on the annular end wall of the cylinder 1d remote from the eye 5, and the other end is attached to the plactic body 9b. The bare ends of the wire portions 140a, 140b, 140c projecting from the hose 22 into the plastic body 9b in a manner analogous to the showing at the plug 18 in FIG. 2 are soldered to the three terminals 20a, 20b, 20c respectively. The portions 12a, 12b, 12c of the three insulated conductors which extend upwardly out of the adapter 24 are fastened in circumferentially spaced relationship to the outer surface of the cylinder 1d by a plastic sleeve 13 in the manner described with reference to FIG. 1. The metallic cores of the conductor portions 12a, 12b, 12c are connected to the termminals 21a, 21b, 21c respectively.

The hose 22 and the conductor portions enclosed therein are biased by the non-illustrated steel wire toward the position indicated in broken lines in which the several turns of the helical hose abut against each other. When the piston rod 2b moves outward of the cylinder 1d, the hose and conductors are axially deformed into the fully drawn position in which the helix reaches its maximum pitch when the piston rod 2d is in its outermost, terminal position.

The spring arrangement of FIG. 3 provides three circuits insulated from each other and from the structural elements of the spring. Their use is indicated by the connection of the terminals 20a, 20c to the two poles of a battery 50 on a fixed body portion of a vehicle, not shown otherwise, and by the connection of the terminals 21a, 21c to a lamp 51 representative of a closure movable about a horizontal axis on the fixed body portion in the known manner.

The gas spring arrangement illustrated in FIG. 4 includes a cylinder 1, piston rod 2, piston 3, fastening eyes 4, 5, and sliding contact 6 not significantly different from the corresponding elements described with reference to FIG. 1. The upper end of the cylinder 1 is closed by a circular, transverse wall 34 from which a threaded stud 34' extends through a central opening in an annular plastic insulator 35' for engagement with threads in the eye 5.

Two terminals 30, 33 project from the insulator 35' outside the cavity of the cylinder 1. A curled end of the terminal 33 secured in the insulator makes conductive contact with the stud 34' and thereby with the cylinder 1, and through the sliding contact 6 with the piston rod 2. The end of the terminal 30 in the insulator 35' conductively engages the bare metallic end 12' of a conductor 12 insulated over most of its length by a lacquer not capable of pictorial representation on the scale of FIG. 4. An insulating plastic sleeve 13 fastens the insulated, straight, axial portion of the conductor 12 to the outer surface of the cylinder 1.

A plastic plug 28 has three, integral, axial parts. One part is received in the cylinder 1. The second part is enveloped by a portion of the sleeve 13 extending axially downward beyond the cylinder 1, and third part of reduced circular cross section freely projects downward from the sleeve 13. The lower, bare, metallic end 12' of the conductor 12 makes contact in a recess of the second portion of the plug 28 with an axially elongated contact strip 29 which is exposed on the outer, axial surface of the third plug portion.

The fastening eye 4 is threadedly mounted on the free end of the piston rod 2, and the apertured bottom wall of a cup-shaped plastic insulator 25 is clamped between the eye 4 and a shoulder on the piston rod 2. The piston rod 2 coaxially passes through the recess bounded by the bottom wall and the cylindrical, axial wall of the insulator 25. A terminal strip 26 projects outward of the insulator 25 and is partly embedded in the axial wall of the insulator 25 except for the looped inner end 27 of the strip 26 which projects into the recess of the insulator and conductively engages the contact strip 29 when the piston rod 2 moves axially inward from the illustrated position toward its innermost position. This contact arrangement thus corresponds to the cooperation of contact elements of FIG. 1 which are mounted in the recess bounded by the sleeve 1a and on the surface of plastic body 9 respectively.

A terminal strip 31 projects from the insulator 25 near the eye 5. The portion of the strip 31 embedded in the insulator 25 terminates in a resiliently bent contact portion 32 which conductively engages the piston rod 2 in the aperture of the bottom wall of the insulator.

Figure 4:
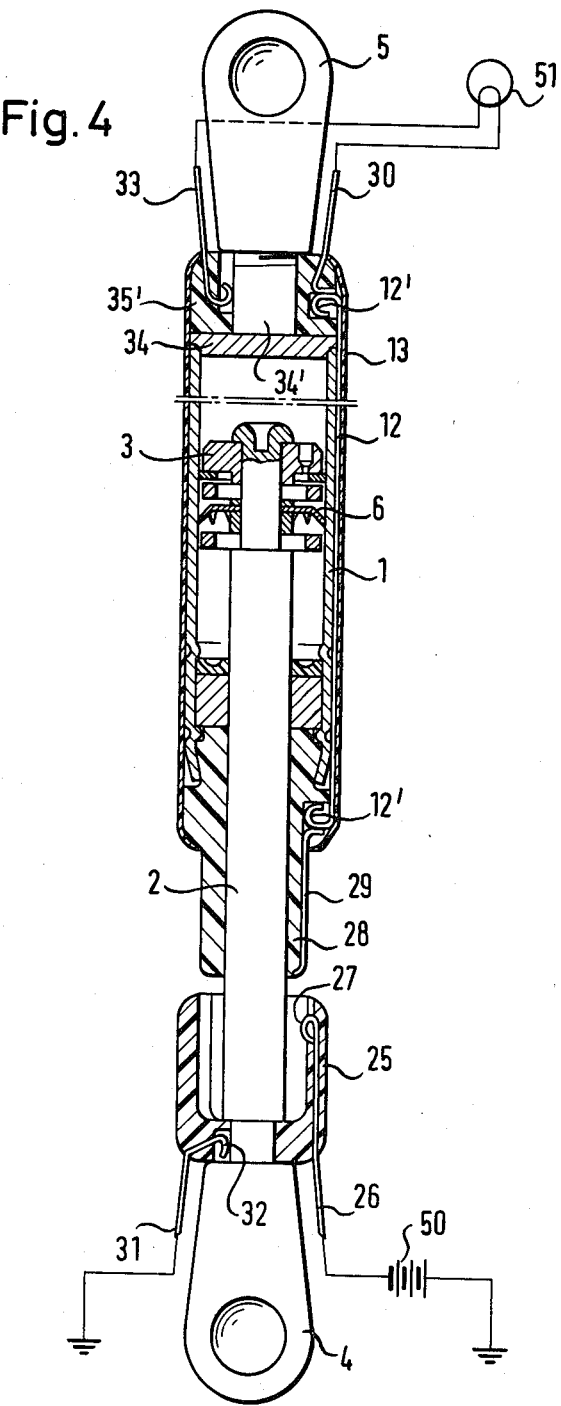

The gas spring arrangement of FIG. 4 provides two conductive connections between pairs of terminals on the piston rod and cylinder, a first constant connection includes the conductive cylinder 1 and piston 2, the second one being insulated from the first one, the cylinder and piston, and being interrupted when the piston rod 2 moves outward of the cylinder 1 away from its terminal position in the cylinder. The battery 50 and lamp 51 shown in FIG. 4 represent elements of the objects normally fastened to the cylinder 1 and piston rod by the fastening eyes 4, 5 and conductively connected by terminals on the spring.

It should be understood, of course, that the foregoing disclosure relates only to preferred embodiments, and that it is intended to cover all changes and modifications of the examples herein chosen for the purpose of the disclosure which do not depart from the spirit and scope of the invention set forth in the appended claims.

What is claimed is:

1. A gas spring arrangement comprising:
  (a) a cylinder member having an axis and being formed with a cavity, said cylinder member including an annular end wall transverse to said axis;
  (b) a body of gas under superatmospheric pressure in said cavity;
  (c) a piston rod member axially movable inward and outward of said cavity in sealing engagement with said end wall between two terminal positions;
  (d) fastening means on respective axially terminal portions of said cylinder and piston rod members outside said cavity for fastening said members to respective objects;
  (e) a first, electrically conductive terminal on said cylinder member outside said cavity;
  (f) a second, electrically conductive terminal on said piston rod member outside said cavity;
  (g) conductive means connecting said first and second electrically conductive terminals during at least a portion of the movement of said piston rod member between said two terminal positions, said conductive means extending substantially the entire length of said cylinder and piston rod members and including a portion of an elongated, flexible conductor which is axially deformed during said movement of the piston rod member; and
  (h) insulating means electrically insulating said conductive means from said cylinder and piston rod members.

2. An arrangement as set forth in claim 1, wherein said portion of the conductor extends in said cavity between an axially terminal portion of said cavity remote from said end wall and the axially terminal portion of said piston rod member in said cavity.

3. An arrangement as set forth in claim 2, wherein said piston rod member is formed with an axial bore, and said elongated, flexible conductive means is received in said axial bore.

4. An arrangement as set forth in claim 2, wherein said portion of said conductor is of helically arcuate shape.

5. An arrangement as set forth in claim 4, further comprising an elongated reinforcing member more rigid than said conductor and transversely secured to said portion of the conductor.

6. An arrangement as set forth in claim 5, wherein said reinforcing member consists of a resilient steel wire assuming a helical shape when in the relaxed condition.

7. An arrangement as set forth in claim 2, wherein said piston rod member is formed with an axial bore, another portion of said conductor being received in said bore.

8. An arrangement as set forth in claim 1, wherein said insulating means include a body of insulating material on the axially terminal portion of said piston rod member outside said cavity, said second terminal being mounted on said body.

9. An arrangement as set forth in claim 1, wherein said insulating means include a body of insulating material on an axially terminal portion of said cylinder member remote from said end wall, said first terminal being mounted on said body.

10. An arrangement as set forth in claim 9, wherein said body constitutes an end wall of said cylinder member.

11. A gas spring arrangement comprising:
(a) a cylinder member having an axis and being formed with a cavity, said cylinder member including an annular end wall transverse to said axis;
(b) a body of gas under superatmospheric pressure in said cavity;
(c) a piston rod member formed with an axial bore therein and being axially movable inward and outward of said cavity in sealing engagement with said end wall between two terminal positions;
(d) fastening means on respective axially terminal portions of said cylinder and piston rod members outside said cavity for fastening said members to respective objects;
(e) a first, electrically conductive terminal on said cylinder member outside said cavity;
(f) a second, electrically conductive terminal on said piston rod member outside said cavity;
(g) conductive means connecting said first and second electrically conductive terminals during at least a portion of the movement of said piston rod member between said two terminal positions, said conductive means extending substantially the entire length of said cylinder and piston rod members and including a first portion of an elongated, flexible conductor extending in said cavity between an axially terminal portion of said cavity remote from said end wall and an axially terminal portion of said piston rod member in said cavity which is axially deformed during the movement of said piston rod member, and a second portion of said conductor received in the bore of said piston rod member; and
(h) insulating means electrically insulating said conductive means from said cylinder and piston rod member.

12. A gas spring arrangement comprising:
(a) a cylinder member having an axis and being formed with a cavity, said cylinder member including an annular end wall transverse to said axis;
(b) a body of gas under superatmospheric pressure in said cavity;
(c) a piston rod member axially movable inward and outward of said cavity in sealing engagement with said end wall between two terminal positions;
(d) fastening means on respective axially terminal portions of said cylinder and piston rod members outside said cavity for fastening said members to respective objects;
(e) a first, electrically conductive terminal on said cylinder member outside said cavity;
(f) a second, electrically conductive terminal on said piston rod member outside said cavity;
(g) conductive means connecting said first and second electrically conductive terminals during at least a portion of the movement of said piston rod member between said two terminal positions, said conductive means extending substantially the entire length of said cylinder and piston rod members and including a portion of an elongated, flexible conductor which extends axially along said piston rod member outside said cavity and is axially deformed during the movement of said piston rod member; and
(h) insulating means electrically insulating said conductive means from said cylinder and piston rod member.

13. A gas spring arrangement comprising:
(a) a cylinder member having an axis and being formed with a cavity, said cylinder member including an annular end wall transverse to said axis;
(b) a body of gas under superatmospheric pressure in said cavity;
(c) a piston rod member axially movable inward and outward of said cavity in sealing engagement with said end wall between two terminal positions;
(d) fastening means on respective axially terminal portions of said cylinder and piston rod members outside said cavity for fastening said members to respective objects;
(e) a first, electrically conductive terminal on said cylinder member outside said cavity;
(f) a second, electrically conductive terminal on said piston rod member outside said cavity;
(g) conductive means connecting said first and second electrically conductive terminals during at least a portion of the movement of said piston rod member between said two terminal positions, said conductive means extending substantially the entire length of said cylinder and piston rod members and including a portion of an elongated, flexible conductor which extends axially along and helically envelops said piston rod member outside said cavity, and is axially deformed during the movement of said piston rod member; and
(h) insulating means electrically insulating said conductive means from said cylinder and piston rod members.

14. An arrangement as set forth in any one of claims 11, 12 or 13, and further comprising a resilient steel wire secured in said axially deformable portion of said conductor.

15. An arrangement as set forth in claim 14, wherein said resilient steel wire assumes a helical shape when said piston rod is in one of said terminal positions.

16. An arrangement as set forth in claim 12 or 13, wherein another portion of said conductor axially extends outside said cavity along said cylinder member and is connected to said first terminal.

* * * * *

UNITED STATES PATENT AND TRADEMARK OFFICE
CERTIFICATE OF CORRECTION

PATENT NO. : 4,400,600
DATED : August 23, 1983
INVENTOR(S) : Freitag et al.

It is certified that error appears in the above—identified patent and that said Letters Patent is hereby corrected as shown below:

Column 2, line 39, "19a" should read --10a--;

Column 4, line 57, "plactic" should read --plastic--;

Column 4, lines 67-68, "termminals" should read --terminals--;

Column 7, line 8, "claim 1" should read --claims 1, 11, 12 or 13--;

Column 7, line 13, "claim 1" should read --claims 1, 11, 12 or 13--.

Signed and Sealed this

Thirteenth Day of December 1983

[SEAL]

Attest:

GERALD J. MOSSINGHOFF

Attesting Officer

Commissioner of Patents and Trademarks